US006352784B1

(12) United States Patent
Katagiri

(10) Patent No.: US 6,352,784 B1
(45) Date of Patent: Mar. 5, 2002

(54) WOOD DECORATIVE MATERIAL COATED WITH RESIN COMPOSITE FILM AND PROCESS FOR PRODUCING THE SAME

(75) Inventor: Mikio Katagiri, Tokyo (JP)

(73) Assignee: Tohcello Co. Ltd., Tokyo (JP)

( * ) Notice: Subject to any disclaimer, the term of this patent is extended or adjusted under 35 U.S.C. 154(b) by 0 days.

(21) Appl. No.: 09/106,138

(22) Filed: Jun. 29, 1998

(30) Foreign Application Priority Data

Jun. 30, 1997 (JP) ........................................... 9-174567
May 21, 1998 (JP) ........................................... 10-140035

(51) Int. Cl.[7] ........................................... B32B 21/08

(52) U.S. Cl. ...................... 428/511; 428/217; 428/515; 428/516; 428/481; 428/483; 428/479.6; 428/349; 428/910; 156/244.11; 156/306.6; 156/332; 156/334

(58) Field of Search ................................ 428/511, 515, 428/516, 910, 217, 481, 483, 479.6, 349; 156/244.11, 244.21, 306.6, 334, 332, 325

(56) References Cited

U.S. PATENT DOCUMENTS

| | | | | | |
|---|---|---|---|---|---|
| 4,337,107 | A | | 6/1982 | Eshleman | 156/249 |
| 4,367,113 | A | * | 1/1983 | Karun et al. | 156/327 |
| 4,743,509 | A | | 5/1988 | Kokrhanek | 428/425.1 |
| 5,277,947 | A | * | 1/1994 | Case et al. | 428/514 |

FOREIGN PATENT DOCUMENTS

| | | | | |
|---|---|---|---|---|
| DE | 4222832 | | * | 1/1994 |
| EP | 0397425 | A2 | | 11/1990 |
| JP | 5316072 | | | 2/1978 |
| JP | 53109907 | | | 9/1978 |
| JP | 5449311 | | | 4/1979 |
| JP | 04279345 | A | | 10/1992 |
| JP | 07276311 | | | 10/1995 |
| JP | 07276311 | A | | 10/1995 |
| JP | 10046121 | | * | 2/1998 |

OTHER PUBLICATIONS

Ullmann's "Encyclopedia of Industrial Chemistry" 1988.*

* cited by examiner

*Primary Examiner*—Paul Thibodeau
*Assistant Examiner*—D. Lawrence Tarazano
(74) *Attorney, Agent, or Firm*—Birch, Stewart, Kolasch & Birch, LLP

(57) ABSTRACT

A wood decorative material coated with resin composite film, comprising a laminate of, arranged in the following order, a wood substrate; a heat bonding layer (A) formed from a heat bonding resin composition comprising 100 parts by weight of a thermoplastic resin (a-1) and 0.001 to 80 parts by weight of a tackifier resin (a-2), the above heat bonding resin composition having a melting point or softening temperature of 170° C. or below and exhibiting a melt flow rate (MFR) at 190° C. of 1 to 500 g/10 min; and a mar-proof surface layer (B). Not only can beautiful appearance be obtained while retaining natural texture without the application of lacquer but also surface protection and bending working properties are improved.

18 Claims, No Drawings

WOOD DECORATIVE MATERIAL COATED WITH RESIN COMPOSITE FILM AND PROCESS FOR PRODUCING THE SAME

FIELD OF THE INVENTION

The present invention relates to a decorative material coated with resin composite film and a process for producing the same. More particularly, the present invention is concerned with a decorative laminate having a natural wood or an artificial wood as a substrate, which is used as a decorative material in decorative plywoods and decorative laminated lumbers for architectural purposes and which is excellent in properties such as appearance, strength, protection capability, bending workability and environmental adaptability. Further, the present invention is concerned with a process for producing the above decorative laminate.

BACKGROUND OF THE INVENTION

The decorative plywoods for architectural purposes are largely classified, depending on the type of decorative material bonded to the decorative plywoods, into the veneer decorative plywoods in which a thin veneer of natural wood or artificial wood is bonded to a plywood and the synthetic resin decorative plywoods in which wood grain imitation or other designing is carried out with the use of a synthetic resin material. The synthetic resin decorative plywoods include the resin impregnated paper overlay plywoods having a resin treated printed decorative paper bonded to a plywood, the resin film overlay plywoods having a polyvinyl chloride sheet bonded to a plywood and the resin decorative laminate overlay plywoods having a polyester or melamine decorative laminate bonded to a plywood. The fundamental difference between the veneer decorative plywoods and the synthetic resin decorative plywoods resides in that, while the use of natural lumber as a raw material and the utilization of the wood texture thereof are adhered to in the veneer decorative plywoods, the appearance of natural lumber is imitated by printing wood grain on paper or a resin sheet and further embossing it, or an entirely different design is imparted by, for example, printing in the synthetic resin decorative plywoods. As a matter of course, the veneer decorative plywoods utilizing the texture of natural lumber are regarded as high-grade articles and preferred.

The terminology "artificial wood veneer" used herein means a fabricated veneer obtained by slicing a laminated and glued flitch into veneers and forming a cross grain or straight grain pattern thereon. In the veneer decorative plywood, the material of the veneer, although the working of lamination and gluing have been effected thereto, is nothing but natural wood and the texture thereof is the same as that of lumbers. Further, the natural wood veneers also include a material known as a sliced veneer, obtained by thinly slicing a lumber with the use of an edge tool and flatly joining slices with an adhesive into a thin plate having given width and length.

Moreover, the laminated lumbers for architectural purposes are known, which are also classified into the decorative laminated lumbers for furnishing purposes and the decorative laminated lumbers for structural purposes in which a thin veneer of natural or artificial wood is bonded to a lumber with a view to exhibiting beautiful appearance.

The veneer of natural wood or artificial wood for use in the surface of the above conventional veneer decorative plywoods or decorative laminated lumbers has a thickness as small as about 0.2 to 2.0 mm. Thin veneers per se have poor strength and are likely to be broken, so that they are generally reinforced with, for example, Japanese paper or a nonwoven fabric of vinylon, rayon or polyester, which is bonded to the back of the veneers with the use of an emulsion adhesive. The thus obtained veneers are each bonded to the surface of plywood or laminated lumber with the use of, for example, a urea resin adhesive or a melamine/urea co-condensate resin adhesive. This bonding is generally performed as for flat materials by the use of a hot press and performed as for laminated lumbers for furnishings such as a pillar, a sill and a threshold, with a given configuration by the so-called profile wrapping method in which the veneer is continuously wound round the configuration of lumber.

In this profile wrapping method, the conventional thin veneer and sliced veneer often suffers from breakage or cracking at curved parts or corner parts of lumbers because of its strength insufficiency and intense directional property. Therefore, this conventional profile wrapping method not only encounters configurational constraints in the processing but also has a problem in product yield.

Furthermore, when an interior finish door or furniture is produced by bending the decorative plywood, a V-cut is first made in the plywood part and, thereafter, bending is performed so that an end face of the decorative plywood is not exposed outward. In this instance, the decorative laminate constituting the surface of the decorative plywood often suffers from breakage or cracking.

Still further, the surface of these decorative plywood and decorative laminated lumber is finished by means of a supersurfacer or sander because the appearance thereof is important. Moreover, the surface is finally coated with a lacquer for protecting the finished surface and for obtaining a glossy or semiglossy beautiful appearance. This lacquer coating may be performed either in the plant prior to delivery of the construction material or after the completion of assembly at the construction site. In either case, the lacquer coating is often conducted twice or thrice in order to prevent the occurrence of cracks with the passage of time or to maintain desirable appearance for a prolonged period of time. This not only increases workload but also causes a serious problem of solvent evaporation polluting the environment. In particular, when the lacquer coating is conducted after the completion of construction work, the solvent would remain in the building. The remaining solvent is considered to cause the tenants and users to suffer from asthma or various atopic symptoms, and this is drawing serious attention in recent years.

As apparent from the above, although the thin decorative veneer or the sliced veneer of natural wood or artificial wood uses a natural material to thereby exhibit the highest-grade appearance as a decorative laminate material, not only does the strength constraint render the handling thereof difficult but also the lacquer coating is needed at the final finish and the solvent thereof has the danger of causing environmental pollution and a bad influence on the tenants' health.

Various improvements have been attempted for resolving such drawbacks of the above natural decorative veneer and sliced veneer. Some are based on the concept of bonding a transparent film or sheet made of a synthetic resin to the surface of natural decorative veneer to thereby provide an overcoat as a surface protective layer. The overcoats are classified depending on the type of synthetic resin into the overcoats of thermosetting resin films and the overcoats of thermoplastic resin films. The overcoats of thermoplastic resin films are generally preferred from the viewpoint of easy handling in the processing, because the thermosetting resins take a long time in the hardening thereof and require much labor in intermediate stage handling and superintendence.

In these circumstances, various proposals have been made with respect to the decorative veneer and sliced veneer in which a resin film is employed.

For example, in Japanese Patent Laid-open Publication No. 53(1978)-109907, a method is proposed which comprises attaching a resin sheet obtained by impregnating a fibrous sheet such as a nonwoven fabric with a thermosetting resin such as a polyester, a polyurethane or an epoxy, a cellulose film and/or a synthetic resin film to the surface of decorative veneer and effecting a bonding under heating and pressure with the use of a hot press. Films of at least one member selected from among thermoplastic synthetic resins such as polyethylene, polypropylene, vinyl acetate resin (including partial hydrolyzates), EVA resin (including partial hydrolyzates), polyvinyl alcohol, polyethylene/vinyl alcohol, polyvinyl acetal, fluorinated resins, vinyl chloride resin, vinylidene chloride resin, styrene resin, AS resin, ABS resin, acrylic resins, polyester resin, polyamide resins, acetal resin, polyurethane, polycarbonate, polyimide resin and ionomer resin, and films coated with these thermoplastic synthetic resins are mentioned in the published specification as examples of the above synthetic resin films.

In particular, a decorative veneer produced by hot pressing a laminate film consisting of a 0.02 mm thick polyester film and a 0.02 mm EVA film on the EVA film side as a bonding surface to a walnut sliced veneer under such conditions that the temperature, pressure and duration are 120° C., 5 kg/cm$^2$ and 2 min, respectively is described in working examples of the published specification.

Further, Japanese Patent Laid-open Publication No. 54(1979)-49311 describes a method comprising laminating synthetic resin films to the top and back surfaces of a decorative rotary veneer and continuously bonding the laminate together by means of a hot pressing roller. For example, veneers having a film of thermosetting synthetic resin such as an alkyd resin, a melamine resin or a polyester resin bonded to its top and having a film of thermoplastic synthetic resin such as a polystyrene resin or a polyethylene resin bonded to its back are described in the published specification. It is also described that either a thermosetting resin film or a thermoplastic resin film can be selected for use in each of the synthetic resin films in conformity with the object of use.

Still further, Japanese Patent Laid-open Publication No. 53(1978)-16072 discloses a process for producing a decorative material with enriched wood texture, characterized in that any desired wood grain pattern is printed on a transparent thermoplastic resin film with the use of a transparent ink and that the film is laid on a wood substrate and heated under pressure so that part or all of the film intrudes into irregularities of the substrate surface to thereby attain a uniform bonding. Acrylic resin, polyethylene, polypropylene, polyvinyl chloride, nylon-6, nylon-6,6, nylon-6,10, polyethylene terephthalate, polyoxymethylene, polycarbonate, etc. are mentioned as the transparent thermoplastic resins. It is described that polyolefin, polyvinyl chloride and acrylic films are preferred and that acrylic films are especially preferred. Further, vinyl, urethane, rubber, acrylic, polyamide, polyester, alkyd and cellulose binders are mentioned as the binders of wood grain printing inks. Also, the published specification discloses applying an adhesive to a printed or nonprinted surface of a thermoplastic resin film or a surface of a wood substrate and thereafter effecting a bonding. In the published specification, there are set forth a working example in which a teak pattern is printed on the back of a transparent acrylic film with the use of a transparent ink and the printed surface is press bonded to a 0.25 mm thick sliced veneer of a manggasinoro lumber under press conditions such that the temperature, pressure and duration are 150° C., 10 kg/cm$^2$ and 2 min, respectively, and another working example in which a rose pattern is printed on the top of an acrylic film with the use of a transparent ink, the nonprinted surface of the acrylic film is gravure coated with an adhesive varnish, the varnish surface is disposed on a sliced veneer and bonded together by a roll press heated at 230° C. at a speed of 8 m/min and an acrylic urethane resin paint is applied onto the printed surface in order to enhance the surface property thereof.

Moreover, Japanese Patent Laid-open Publication No. 4(1992)-279345 discloses a process for producing a sliced veneer decorative sheet, in which a wood grain pattern layer is disposed on a support of plastic film with the use of a colored transparent ink and the thus obtained printed decorative sheet is continuously laminated through a transparent adhesive to a sliced veneer of large length having joint lines. In this process, the adhesive is applied to the sliced veneer and dried, and the printed decorative sheet is disposed thereonto and bonded together under pressure by means of a hot roll. In the Examples, a working example is described in which a vinyl acetate resin emulsion is used as the adhesive.

Furthermore, Japanese Patent Laid-open Publication No. 7(1995)-276311 discloses a decorative laminate comprising a decorative laminate surface having a pattern printed thereon and, superimposed on the pattern, a surface protective layer formed by self-fusion bonding of a hot-melt transparent synthetic resin sheet and also discloses the same decorative laminate as above except that a pattern is printed on the back of the transparent synthetic resin sheet. Polyethylene sheet, cellophane, an acetate sheet, a polyvinyl chloride sheet, a polypropylene sheet, a polystyrene sheet, a polyester sheet, a nylon sheet, a Saran sheet, etc. are mentioned as the transparent synthetic resin sheet for use in the invention of the published specification. It is described that the temperature at which these sheets are self-fusion bonded to the decorative laminate ranges from 140 to 200° C. in the use of polyester sheets, from 110 to 200° C. in the use of cellophane, from 100 to 170° C. in the use of polyvinyl chloride sheets, from 140 to 180° C. in the use of polystyrene sheets and from 150 to 220° C. in the use of polyester sheets. It is also described that use can be made of sheets obtained by coating the above sheets with a heat bonding resin. However, there is no description relating to the particular of employed films, the conditions of thermocompression bonding, etc.

As apparent from the above, there has been the concept of performing a thermocompression bonding of a thermoplastic film, which can be easily handled in the processing, to thereby form a surface protective layer in order to resolve the drawbacks of natural decorative veneer and sliced veneer. However, actually, scarcely any merchandise of the above structure is found on the market. The reason is nothing but the presence of problems in putting the above structure into practical use. For example, the bonding strength between the film and the decorative veneer has not reached a practically satisfactory level, or the heat bonding takes much time to thereby result in poor production efficiency, or additional workload is required such as applying an emulsion adhesive to the veneer side and drying the same for bonding purposes, in the processes described in the above published specifications. That is, the wood substrate has considerable irregularities formed at its surface as different from other adherends. It is extremely difficult to bond a resin film so that a uniform bonding strength is realized on such irregularities of the surface, and no decorative laminate having such a durability as can meet practical use has been developed.

Further, in the prior art processes, the actual bonding strength is brought about by the binder of printing ink or the resin component of adhesive varnish applied to the film, so that the ink or varnish applying step cannot be avoided to thereby cause a problem of seriously restricting the process for producing the decorative laminate.

Still further, there may be great differences among natural decorative veneers or sliced veneers with respect to the material density, vessel density, texture orientation, etc. When veneers are dyed or other wise colored, the above differences may lead to differences in colorant permeability, thereby resulting in different degrees of coloring. It has been proposed to bond a transparent film having wood grain pattern printed thereon with the use of a transparent ink to the surface of veneers or sliced veneers as mentioned above in order to render the difference in appearance between a plurality of veneers or sliced veneers less noticeable. However, this measure of imparting an artificial design involves a problem of rather leading to loss of the inherent texture of lumber.

OBJECT OF THE INVENTION

The present invention has been made with a view toward solving the above problems of the conventional decorative veneer for use in decorative plywoods and decorative laminated lumbers. It is a principal object of the present invention to provide at high production efficiency a novel decorative veneer or sliced veneer coated with synthetic resin composite film, which is free from configurational constraints experienced in the application of a thin decorative veneer or sliced veneer to the surface of a plywood or a laminated lumber, which is also free from breakage or cracking and which is further free from environmental pollution and tenants' health problems attributed to solvent evaporation caused by lacquer application for surface finishing.

It is a particular object of the present invention to provide a wood decorative material coated with resin composite film in which a mar-proof film is bonded to the surface of a wood substrate with a practically satisfactory bonding strength and to provide a process for producing the wood decorative material coated with resin composite film.

SUMMARY OF THE INVENTION

The wood decorative material coated with resin composite film according to the present invention comprises:

a wood substrate, a heat bonding layer (A) disposed on a surface of the wood substrate, this heat bonding layer (A) formed from a heat bonding resin composition comprising 100 parts by weight of a thermoplastic resin (a-1) and 0.001 to 80 parts by weight of a tackifier resin (a-2), this heat bonding resin composition having a melting point or softening temperature of 170° C. or below and exhibiting a melt flow rate (MFR) at 190° C. of 1 to 500 g/10 min, and a mar-proof surface layer (B) bonded to the wood substrate surface by means of the heat bonding layer (A).

The above wood decorative material coated with resin composite film can be produced by a process comprising disposing on a surface of a wood substrate a heat bonding layer (A) composed of a heat bonding resin composition (a) comprising 100 parts by weight of a thermoplastic resin (a-1) and 0.001 to 80 parts by weight of a tackifier resin (a-2), this heat bonding resin composition having a melting point or softening temperature of 170° C. or below and exhibiting a melt flow rate (MFR) at 190° C. of 1 to 500 g/10 min, and bonding a mar-proof surface layer (B) to the wood substrate by means of the heat bonding layer (A), wherein a film B for forming the mar-proof surface layer B is extrusion coated with the heat bonding resin composition (a) to thereby form a composite film having a layer construction of the heat bonding layer (A)/mar-proof surface layer (B), and the composite film is heat bonded to the wood substrate surface; or wherein the heat bonding resin composition (a) is molded into a film to thereby obtain a heat bonding film A, subsequently the heat bonding film A is bonded to a resin film B for forming the mar-proof surface layer (B) with another adhesive component (c) to thereby form a composite film having a layer construction of the heat bonding layer (A)/layer of other adhesive component (C)/mar-proof surface layer (B), and the composite film is heat bonded to the wood substrate surface; or wherein a resin (b) for forming the mar-proof surface layer (B) and the heat bonding resin composition (a) are co-extruded, or a resin (b) for forming the mar-proof surface layer (B) and the heat bonding resin composition (a) are co-extruded with another adhesive resin (c') interposed therebetween, thereby forming a composite film having a layer construction of the mar-proof surface layer (B)/heat bonding layer (A) or a layer construction of the mar proof surface layer (B)/layer of other adhesive resin (C')/heat bonding layer (A), and the composite film is heat bonded to the wood substrate surface.

The wood decorative material coated with resin composite film according to the present invention comprises a natural wood or artificial wood decorative veneer as a substrate used for decorative plywoods or decorative laminated lumbers, and intended to include those dyed or otherwise colored for retaining the texture.

DETAILED DESCRIPTION OF THE INVENTION

The wood decorative material coated with resin composite film according to the present invention and the process for producing the same will be described in detail below.

The wood decorative material coated with resin composite film according to the present invention comprises a wood substrate, a heat bonding layer (A) and a mar-proof surface layer (B) bonded to the wood substrate surface by means of the heat bonding layer (A).

In the present invention, the heat bonding layer (A) is formed from a heat bonding resin composition (a). This heat bonding resin composition (a) comprises a thermoplastic resin (a-1) and a tackifier resin (a 2).

The heat bonding resin composition (a) for use in the present invention preferably satisfies the following four requirements:

the composition is transparent or translucent;

the melting point or softening temperature of the composition is 170° C. or below, especially, in the range of 40 to 150° C.;

the composition can be thermally bonded to a decorative veneer or a sliced veneer with a satisfactorily large bonding strength; and the composition has desirable processability such that a film can be stably molded by extrusion.

Examples of the thermoplastic resins (a-1) as a component of the heat bonding resin composition (a) for use in the present invention include polyolefins, polyolefin copolymers, ethylene/fatty acid vinyl ester copolymers, saponified products of ethylene/fatty acid vinyl ester copolymers, ethylene/α,β-unsaturated carboxylic acid alkyl ester copolymers, ethylene/α,β-unsaturated carboxylic acid copolymers, and partial metal neutralization products thereof, ethylene/α,β-unsaturated carboxylic acid/α,β-unsaturated carboxylic acid alkyl ester terpolymers, and partial metal neutralization products thereof, lowly crystalline or amorphous copolyesters and lowly crystalline or amorphous polyamides. These can be used either individually or in combination.

Examples of the polyolefins used as the thermoplastic resin (a-1) in the present invention include polyethylene, polypropylene, polybutene-1, copolymers of ethylene and at least one α-olefin having at least three carbon atoms and copolymers of propylene and at least one α-olenfin having at least four carbon atoms.

Specific examples of the polyolefins include:

copolymers of ethylene and at least one member selected from among propylene, butene-1, pentene-1, hexene-1, heptene-1, octene-1, decene-1, 3-methylbutene-1 and 4-methylpentene-1; and copolymers of propylene and at least one member selected from among butene-1, pentene-1, hexene-1, heptene-1, octene-1, decene-1, 3-methylbutene-1 and 4 methylpentene-1. The polyolefins are not limited to the above listed examples.

The above polyolefin resins may be graft modified by, for example, maleic anhydride, acrylic acid, methacrylic acid or glycidyl methacrylate in order to in improve the adherence to a wood veneer.

Examples of the ethylene/fatty acid vinyl ester copolymers used as the thermoplastic resin (a-1) include ethylene/vinyl acetate copolymer and ethylene/vinyl propionate copolymer.

Examples of the ethylene/α,β-unsaturated carboxylic acid alkyl ester copolymers include copolymers of ethylene and a member selected from among methyl acrylate, ethyl acrylate, propyl acrylate, n-butyl acrylate, methyl methacrylate, ethyl methacrylate, propyl methacrylate and n-butyl methacrylate.

Examples of the α,β-unsaturated carboxylic acids as a component of the ethylene/α,β-unsaturated carboylic acid copolymers include acrylic acid, methacrylic acid and partial metal neutralization products thereof. Examples of metal ions include $Na^+$, $K^+$, $Ca^{++}$, $Zn^{++}$ and $Mg^{++}$.

The lowly crystalline or amorphous copolyesters used as the thermoplastic resin (a-1) are copolymers of a dicarboxylic acid and a polyhydric alcohol. Examples of suitable dicarboxylic acids include aromatic carboxylic acids such as terephthalic acid, isophthalic acid, orthophthalic acid and paraphenylenedicarboxylic acid; alicyclic carboxylic acids such as 1,4-cyclohexanedicarboxylic acid; and aliphatic carboxylic acids such as succinic acid, glutaric acid, adipic acid, suberic acid and sebacic acid. Examples of suitable polyhydric alcohols include ethylene glycol, 1,2-propylene glycol, 1,4-butanediol, 1,5-pentanediol, 1,6-hexanediol, neopentyl glycol, diethylene glycol, polyethylene glycol, polytetramethylene glycol and 1,4-cyclohexanedimethanol. Examples of the copolyesters include terpolymer of terephthalic acid, adipic acid and ethylene glycol, terpolymer of terephthalic acid, sebacic acid and ethylene glycol, terpolymer of terephthalic acid, isophthalic acid and ethylene glycol and terpolymer of terephthalic acid, isophthalic acid and 1,4-butanediol.

Examples of the lowly crystalline or amorphous polyamides used as the thermoplastic resin (a-1) include copolyamides such as nylon 6/66/12 which is a copolymer of ϵ-caprolactam, adipic acid hexamethylenediamne and laurolactam, nylon 6/610/12 which is a copolymer of ϵ-caprolactam, sebacic acid hexamethylenediameine and laurolactam, nylon 6/612/12 which is a copolymer of ϵ-caprolactam, dodecane dicarboxylic acid hexamethylenediamine and laurolatam, nylon 6/66/610/12 which is a copolymer of ϵ-caprolactam, adipic acid hexamethylenediamine, sebacic acid hexamethylenediamine and laurolactam, nylon 6/66/11/12 which is a copolymer of ϵ-caprolactam, adipic acid hexamethylenediamine, ω-aminoundecanoic acid and laurolactam.

The above thermoplastic resins (a-1) can be used either individually or in combination.

Examples of the tackifier resins (a-2) as a component of the heat bonding resin composition (a) for use in the present invention include:

rosins such as gum rosin and wood rosin;

modified rosins such as hydrogenated rosin, disproportioned rosin, polymerized rosin and maleic acid modified rosin;

rosin esters such as rosin glycerol ester and hydrogenated rosin glycerol ester;

terpene resins such as α-pinene resin, β-pinene resin and dipentene resin;

terpene phenol resins such as α-pinene phenol resin and dipentene phenol resin;

aromatic hydrocarbon modified terpene resins, aliphatic petroleum resins and alicyclic petroleum resins; and styrene resins composed mainly of monomeric units selected from among styrene, α-methylstyrene, vinyltoluene and isopropenyltoluene units. These tackifier resins can be used either individually or in combination.

The heat bonding resin composition (a) for use in the present invention contains the tackifier resin (a-2) in an amount of up to 80 parts by weight (not greater than about 45% by weight based on the weight of polymers), preferably, up to 60 parts by weight (not greater than about 38% by weight based on the weight of polymers) per 100 parts by weight of the thermoplastic resin (a-1). When the amount of tackifier resin (a-2) is greater than 80 parts by weight, the melt viscosity of the composition is excessively lowered to thereby render the film moldability poor and to thereby cause the tackiness of the molded film surface to become too large with the result that problems are likely to occur in the handling.

The lower limit of the amount of tackifier resin (a-2) mixed into the heat bonding resin composition (a) is 0.001 part by weight, preferably, 1 part by weight and, still preferably, 2 parts by weight. When the amount of mixed tackifier resin (a-2) is smaller than 0.001 part by weight, the bonding strength exhibited to wood is likely to be poor.

The heat bonding resin composition (a) for use in the present invention is transparent or translucent. The melting point or softening temperature of the heat bonding resin composition (a) is 170° C. or below, preferably, in the range of 40 to 150° C. for preventing the warping or otherwise deforming of the veneer at the time of thermocompression bonding to decorative veneer by means of a heating roller. This heat bonding resin composition (a) has excellent heat bonding property to wood, so that the laminate of veneer and resin composite film according to the present invention, after heat bonding under appropriate conditions, has a bonding strength as large as inviting a cohesive failure of the veneer at the time of peeling.

It is requisite that the melt flow rate (MFR) of the heat bonding resin composition (a) fall within a given range for reconciling extrudability and wood substrate wetting and infiltration exhibited at the time of heat bonding to wood. In the present invention, the MFR at 190° C. is necessarily in the range of 1 to 500 g/10 min, preferably, 2 to 200 g/10 min. When the MFR is lower than 1 g/10 min, the motor load becomes too large at the time of extruding a film for forming the heat bonding layer and not only are molding problems such as film surface roughening invited but also wood surface wetting properties are deteriorated at the time of heat bonding. On the other hand, when the MFR is greater than 500 g/10 min, the melt viscosity is too low, thereby not only instabilizing a melted resin film at the time of extrusion but also inviting oozing of melted film edges at the time of heat bonding to wood with the result that working efficiency is lowered.

The above heat bonding resin composition (a) can be prepared by mixing the thermoplastic resin (a-1) and the tackifier resin (a-2) together and melt kneading the mixture by means of a suitable blender such as a single-screw extruder, a twin-screw extruder or any of various continuous mixers. The thus obtained heat bonding resin composition (a) has excellent extrudability and can be heat bonded to wood with a satisfactorily large bonding strength.

According to necessity, a slip agent and an antiblocking agent can be added to the heat bonding resin composition (a) for use in the present invention in order to improve workability at the time of film molding or thereafter. Examples of suitable slip agents include higher fatty acids having 8 to 22 carbon atoms, metal salts of higher fatty acids having 8 to 22 carbon atoms, linear aliphatic monohydric alcohols having 8 to 18 carbon atoms, higher fatty acid amides having 8 to 22 carbon atoms, ethylene bis(fatty acid (e.g., having 16 carbon atoms or 18 carbon atoms) amide).

Examples of suitable antiblocking agents include silica, calcium carbonate, magnesium hydroxide, clay, talc and mica.

Moreover, the heat bonding resin composition (a) can be loaded with additives commonly incorporated in resin compositions, such as ultraviolet absorbers.

The wood decorative material coated with resin composite film according to the present invention has a mar-proof surface layer (B), which is formed from a transparent or translucent resin film. The resin film constituting this mar-proof surface layer is formed from a resin (b) whose melting point or softening temperature is generally at least 20° C., preferably, 30 to 250° C. higher than that of the heat bonding resin composition constituting the heat bonding layer (A) so that the surface condition of the mar-proof surface layer (B) is not changed by, for example, emboss rolls at the time of thermocompression bonding of the composite film to, for example, a decorative veneer. Further, it is preferred that the mar-proof surface layer (B) has satisfactory scratch hardness and also satisfactory strength and chemical resistance for a surface layer. That is, the resin (b) constituting this mar-proof surface layer preferably has a Shore D hardness of at least 55 and a Rockwell hardness of not greater than 125, still preferably, a Shore D hardness of at least 65 and a Rockwell hardness of not greater than 120. Especially preferred use is made of a resin having a Rockwell R hardness of at least 85 and a Rockwell hardness of not greater than 120.

In the present invention, the resin (b) constituting the mar-proof surface layer (B) can be selected from among, for example, polypropylene, polymethylpentene, polyester resins such as polyethylene terephthalate, polybutylene terephthalate and polyethylene naphthalate, polyamide resins such as nylon-6 and nylon-66, polycarbonate, acrylic resins such as polymethyl methacrylate, polyvinyl alcohol, ethylene/vinyl alcohol copolymer, polyvinyl chloride, styrene resins such as polystyrene and AS resin and fluorinated resins such as tetrafluoroethylene/perfluoroalkyl vinyl ether copolymer (PFA), tetrafluoroethylene/hexafluoropropylene copolymer (FEP), polychlorotrifluoroethylene (PCTFE), tetrafluoroethylene/ethylene copolymer (ETFE), chlorotrifluoroethylene/ethylene copolymer (ECTFE) and polyvinylidene fluoride (PVDF).

For example, films of polytetrafluoroethylene (TFE) and ultrahigh molecular weight polyethylene obtained by skiving a billet produced by compression molding and films of polyvinyl alcohol, triacetylcellulose and polyvinyl fluoride (PVF) obtained by casting can generally be used as the resin (b) constituting the mar-proof surface layer (B) for use in the present invention.

In the present invention, the mar-proof surface layer (B) is preferably formed from a film obtained by molding the above resin (b). This film can be any of nonoriented, monoaxially oriented or biaxially oriented films produced by extruding the resin (b), the above films obtained by skiving or casting and other types of films. Of these, a biaxially oriented polypropylene film, a biaxially oriented polyethylene terephthalate film and a biaxially oriented nylon film can be mentioned as especially preferred examples thereof.

The above film for forming the mar-proof surface layer (B) can be finished to realize an arbitrary desired appearance, for example, glossy, semi-glossy, matte or transparent colored appearance according to necessity. However, for utilizing the surface condition of the wood substrate, the film is required to be transparent or translucent. The above appearance can be realized by directly applying any of conventional film processing techniques such as surface coating with a matting agent, internal addition of a matting agent, internal addition of a filler or pigment and sand blasting.

The thickness of the above mar-proof surface layer (B) is generally in the range of 5 to 100 $\mu$m, preferably, 9 to 50 $\mu$m. The thickness of the heat bonding layer (A) is generally in the range of 10 to 100 $\mu$m, preferably, 20 to 100 $\mu$m. The wood decorative material coated with resin composite film according to the present invention can have satisfactory strength by forming the mar-proof surface layer with the above thickness. The thickness of the heat bonding layer (A) is required to be in the above range so that the mar-proof surface layer can be bonded to the wood substrate with such a strength as can stand practical use.

The wood decorative material coated with resin composite film according to the present invention is a laminate comprising the wood substrate and, bonded thereto by the heat bonding layer (A), the mar-proof surface layer (B). The wood decorative material coated with resin composite film according to the present invention, having the above structure, can be produced by preparing a composite film composed of a laminate of mar-proof surface layer (B) and heat bonding layer (A) and by effecting a thermocompression bonding of the composite film to a surface of the wood substrate.

The lamination through a thermocompression bonding of the composite film to a surface of the wood substrate can be conducted by any of the following methods.

In method (1), the heat bonding resin composition (a) is laminated by extrusion coating onto a surface of film B for forming the mar-proof surface layer (B) to thereby form the heat bonding layer (A), so that a laminate film consisting of the heat bonding layer (A)/mar-proof surface layer (B) is obtained. This composite film is heated and bonded under pressure to a surface of the wood substrate.

In this method, according to necessity, the film B for forming the mar-proof surface layer (B) can be pretreated with, for example, an isocyanate or polyester anchor coating agent in order to increase the adhesion between the layer (A) and the layer (B).

In method (2), the heat bonding resin composition (a) is extruded to thereby first produce a heat bonding film A. Then, a mar-proof surface film B is dry laminated to this heat bonding film A with the use of, for example, an epoxy, isocyanate or polyester reactive adhesive to thereby produce a composite film. This composite film is heated and bonded under pressure to a surface of the wood substrate.

In method (3), a resin film for forming the mar-proof surface layer (B) is bonded to the previously formed heat bonding film A by the extrusion coating method with the use of another adherent component (c) (e.g., molten polyethylene) to thereby obtain a composite film having a layer structure of heat bonding layer (A)/another adherent component layer (C)/mar-proof surface layer (B). This composite film is heated and bonded under pressure to a surface of the wood substrate.

In this method, the mar-proof surface layer film B can be coated with, for example, an isocyanate or polyester anchor coating agent in order to increase the adhesion between the polyethylene film used as another In the above methods (1), (2) and (3), the heat bonding layer (A) can be replaced by a co-extruded double layer (A)/(A') in which another adherent component such as polyethylene or polypropylene is generally used in the layer (A'). In this instance, the layer (A) is arranged on the surface of the wood substrate.

In method (4), without molding the mar-proof surface layer forming resin (b) into a film in advance, the mar-proof surface layer forming resin (b) and the heat bonding resin composition (a) are co-extruded into a laminate film consisting of the mar-proof surface layer (B) and the heat bonding layer (A). This composite film is heated and bonded to a surface of the wood substrate.

In this method, when the chemical affinity between the mar-proof surface layer forming resin (b) and the heat bonding resin composition (a) is poor, a desirable bonding strength may not be obtained by the coextrusion. In that instance, a resin (c') which has satisfactory affinity with both the mar-proof surface layer forming resin (b) and the heat bonding resin composition (a) can be interposed as an adhesive (tie layer) for bonding improvement between the layers of mar-proof surface layer forming resin (b) and heat bonding resin composition (a). For example, when the co-extrusion is conducted using the mar-proof surface layer forming resin (b) selected from among polyethylene terephthalate, nylon-6, nylon-66 and polycarbonate and the heat bonding resin composition (a) composed of a polyolefin or olefinic copolymer and a tackifier, a resin prepared by graft polymerization of a polyolefin or olefinic copolymer in the presence of maleic anhydride, acrylic acid or methacrylic acid can be used as the resin (c') for forming a tie layer. In the thus coextruded film with a layer structure (B)/(C')/(A), the graft resin layer (C') enables ensuring a desirable bonding strength between the mar-proof surface layer (B) and the heat bonding layer (A). The thus co-extruded film with layer structure (B)/(A) or (B)/(C')/(A) can further be monoaxially or biaxially oriented before use.

In that instance, the thickness of the tie layer is generally in the range of 2 to 50 μm, preferably, 5 to 30 μm.

In the present invention, the decorative veneer or the sliced veneer for use in decorative plywoods and decorative laminated lumbers, which is given beautiful appearance without the need to conduct a lacquer coating using a solvent having the danger of inviting environmental pollution or health problems and which also has desirable bonding strength and is further excellent in mechanical strength and fabricability such as profile wrapping workability can be produced, while fully utilizing the texture of natural wood, by thermally bonding the heat bonding layer (A) of the resin composite film comprising at least two layers including the heat bonding layer (A) and the mar-proof surface layer (B), which resin composite film is produced by any of the above methods (1) to (4), to the surface of veneer or sliced veneer of natural wood or artificial wood.

The thus obtained veneer or sliced veneer coated with resin composite film according to the present invention, as a surface decorative material of plywood or laminated lumber, can be bonded to the surface of plywood or laminated lumber by the customary bonding method conducted by means of a hot press or a heating roller with the use of an adhesive. Although urea resin, urea/melamine resin and polyvinyl acetate resin adhesives are generally used as the above adhesive, the heat bonding film A can be used in this instance as well. Naturally, the above heat bonding film A is preferred from the viewpoint of environmental adaptability and influence on tenants.

EFFECT OF THE INVENTION

In the wood decorative material coated with resin composite film according to the present invention, the mar-proof surface material is strongly bonded to the surface of the wood substrate by means of the specified heat bonding resin composition. For example, cracking or breakage of the wood substrate is avoided at the time of profile wrapping. By virtue of the use of the heat bonding resin composition, the mar-proof surface layer is bonded to the wood substrate with such a large bonding strength that, when the mar-proof surface layer is peeled from the wood substrate in an ordinary state, the wood substrate would generally suffer from surface breakage.

Further, this wood decorative material coated with resin composite film has the mar-proof surface layer strongly bonded to the wood substrate, so that, even if no varnish coating is made, highly excellent mar-proof capability can be exhibited.

Still further, the wood decorative material coated with resin composite film which has the above advantageous properties can easily be produced by the process of the present invention. Moreover, fundamentally no organic solvent is used in the process for producing the wood decorative material coated with resin composite film according to the present invention, so that there is no danger of inviting health and environmental problems as caused by the use of organic solvents.

EXAMPLE

The wood decorative material coated with resin composite film according to the present invention will now be illustrated with reference to the following Examples, which in no way limit the scope of the invention.

Example 1

29.5% by weight of polypropylene random copolymer (MFR at 230° C.: 20 g/10 min, density: 0.91 g/cm$^3$) obtained by copolymerizing about 1 mol % of ethylene, about 2 mol % of butene-1 and about 97 mol % of propylene, 25% by weight of low density polyethylene (MFR at 190° C.: 7 g/10 min, density: 0.92 g/cm$^3$), 25% by weight of ethylene/butene-1 copolymer having a butene-1 content of about 10 mol % (MFR at 190° C.: 3 g/10 min, density: 0.98 g/cm$^3$), 20% by weight of alicyclic hydrocarbon tackifier having a ring and ball softening point of 115° C. as a tackifier and 0.5% by weight of silica were dry blended and pelletized by a twin-screw extruder (screw L/D: 42, diameter: 37 mm, rotated in the same direction) at a resin temperature of 210° C. Thus, a heat bonding resin composition (a) was obtained.

The MFR at 190° C. and Vicat softening point of this composition (a) were 8 g/10 min and 73° C., respectively.

Separately, a biaxially oriented polypropylene film matted by adding filler (OP mat-1 (thickness: 20 μm, degree of film haze: 64%) produced by Tohcello Co., Ltd.) was provided as mar-proof surface layer film B. The above heat bonding resin composition (a) was extrusion laminated onto the surface of the mar-proof surface layer film B by means of an extrusion laminator equipped with extruder (screw L/D: 32, diameter: 65 mm) under such conditions that the resin temperature, coating thickness and processing speed were 240° C., 35 μm and 30 m/min, respectively, to thereby form a heat bonding layer (A) on the mar-proof surface layer film B. Thus, a resin composite film consisting of 20 μm of mar-proof surface layer (B)/35 μm of heat bonding layer (A) was obtained.

The melting point and Rockwell R hardness of the polypropylene as a raw material of the mar-proof surface layer film B were 168° C. and 110, respectively.

This resin composite film was set on a 0.3 mm thick decorative sliced veneer having its back reinforced with nonwoven fabric so that the heat bonding layer (A) of the resin composite film contacted the sliced veneer, and introduced between a metal roll for compression bonding heated at 125° C. and a rubber roll. A thermocompression bonding was carried out under a linear pressure of 50 kg/cm and at a speed of 5 m/min.

Thus, there was obtained a laminate consisting of mar-proof surface layer (matted biaxially oriented polypropylene film)/heat bonding layer (tackifier loaded polyolefin composition)/wood substrate (decorative sliced veneer) according to the present invention.

This laminate had a large bonding strength, and a peeling test of the composite film from the sliced veneer resulted in a cohesive failure of the sliced veneer. Further, this laminate possessed the texture of natural wood and exhibited semi-glossy composed appearance. Still further, the laminate was excellent in staining resistance and realized improvements in mechanical strength properties such as marring of sliced veneer surface and breakage during profile wrapping.

The resultant wood decorative material coated with resin composite film (laminate) was wound to a diameter of 20 mm in a longitudinal direction and wound to a diameter of 15 mm in a lateral direction. However, none of cracking and breakage was observed in the laminate. This laminate was bonded to a 4 mm thick plywood by means of a hot press with the use of a urea resin adhesive, thereby obtaining a decorative plywood.

This decorative plywood had excellent marring resistance and satisfied the natural wood decorative plywood standards stipulated by JAS.

Further, this laminate is provided with a vinyl acetate resin adhesive applied to on its back and then was used in profile wrapping fabrication of a plywood having a size of 23 mm height, 110 mm width and 1,800 mm length. The laminate was strongly bonded to the plywood on the each surface and at each corner of the plywood, thereby obtaining a good product.

Example 2

77.8% by weight of ethylene/vinyl acetate copolymer (vinyl acetate content: 6% by weight, MFR at 190° C.: 8 g/10 min), 20% by weight of hydrogenated rosin ester, 0.2% by weight of oleamide and 2% by weight of silica were dry blended and pelletized by a single-screw extruder (screw L/D: 28, diameter: 40 mm) at a resin temperature of 180° C. Thus, a heat bonding resin composition (a) was obtained. The MFR at 190° C. and Vicat softening point of this composition (a) were 28 g/10 min and 68° C., respectively.

This heat bonding resin composition (a) was introduced in a cast film forming machine comprising a single-screw extruder (screw L/D: 28, diameter: 50 mm) equipped with a 400 mm wide T die and formed into a 30 μm thick film at a speed of 20 m/min. Thus, a heat bonding film A was obtained.

The same matted biaxially oriented polypropylene film as employed in Example 1 was used as a mar-proof surface layer film B, one side of which was subjected to corona treatment.

Using the mar-proof surface layer film B as a raw base sheet in an extrusion laminator equipped with extruder (screw L/D: 32, diameter: 65 mm) and further using the heat bonding film A as a raw sheet in a sandwich laminator, low density polyethylene (MFR at 190° C.: 7.5 g/10 min, density: 0.917 g/cm$^3$) was extruded by means of an extruder through T die at a resin temperature of 310° C. so that molten polyethylene film was caused to fall between the corona treated surface of the mar-proof surface layer film B and the heat bonding film A. A composite film having a layer structure consisting of 20 μm of mar-proof surface layer (B)/20 μm of polyethylene film/35 μm of heat bonding layer (A) was prepared at a processing speed of 40 m/min. An isocyanate anchor coating agent was applied in advance to the corona treated surface of the mar proof surface layer film B.

The melting point and Rockwell R hardness of the polypropylene as a raw material of the mar-proof surface layer film B were 168° C. and 110, respectively.

The thus obtained composite film of triple layer structure had satisfactorily large interlayer bonding strength, and there is no indication of peeling.

This composite film was thermocompression bonded to a decorative sliced veneer in the same manner as in Example 1, thereby obtaining a laminate having a layer structure consisting of surface layer (matted biaxially oriented polypropylene film)/intermediate layer polyethylene/heat bonding layer (tackifier loaded ethylene/vinyl acetate copolymer composition)/wood substrate (decorative sliced veneer).

This laminate had a large bonding strength, and a peeling test resulted in a cohesive failure of the sliced veneer.

Further, this laminate possessed the texture of natural wood and had improved surface strength. Although the thus obtained laminate was wound to a diameter of 20 mm in a longitudinal direction and wound to a diameter of 15 mm in a lateral direction, none of cracking and breakage was observed in the laminate.

Example 3

40% by weight of ethylene/vinyl acetate copolymer (vinyl acetate content: 14% by weight, MFR at 190° C.: 15 g/10 min), 40% by weight of ethylene/butene-1 copolymer (MFR at 190° C.: 3 g/10 min, butene-1 content: about 10 mol %), 18% by weight of alicyclic hydrocarbon tackifier and 2% by weight of silica were dry blended and pelletized in the same manner as in Example 1. Thus, a heat bonding resin composition (a) was obtained.

The MFR at 190° C. and Vicat softening point of this heat bonding resin composition (a) were 18 g/10 min and 48° C., respectively.

This heat bonding resin composition (a) was extruded by means of an extruder (screw L/D: 28, diameter: 50 mm) at a resin temperature of 180° C., and low density polyethylene (MFR at 190° C.: 7.5 g/10 min, density: 0.917 g/cm$^3$) as resin (a') was extruded by means of an extruder (screw L/D: 25, diameter: 40 mm) at a resin temperature of 200° C. . The extrudates were joined each other in a 400 mm wide co-extrusion T die at a speed of 20 m/min. Thus, a film having a total thickness of 50 μm, which consisted of heat bonding layer (A)/support layer (A') whose thickness ratio was 25 μm: 25 μm, was formed. The surface A' of the coextruded film was treated with corona discharge for improving wet tension.

Biaxially oriented film of polyester having a melting point of 256° C. and a Rockwell R hardness of ill (thickness: 19 μm) was selected as mar-proof surface layer film B. This biaxially oriented film B was dry laminated to the above co-extruded film A/A' so that the biaxially oriented film was bonded to the surface A' with an isocyanate adhesive. Thus, a resin composite film consisting of mar-proof surface layer (19 μm of biaxially oriented polyester film)/heat bonding layer (25 μm of polyethylene/25 μm of tackifier loaded ethylene/vinyl acetate copolymer composition) was obtained.

This composite film was thermocompression bonded to a 0.3 mm thick decorative sliced veneer in the same manner as in Example 1, except that the temperature of compression bonding metal roll was changed to 150° C., thereby obtaining a laminate having the biaxially oriented polyester film as the mar-proof surface layer. This laminate had a large bonding strength such that the sliced veneer had a cohesive failure.

This laminate possessed the texture of natural wood and exhibited beautiful gloss. Further, the laminate realized improvements in surface hardness, marring resistance and mechanical strength properties such as bending strength.

Although the resultant laminate was wound to a diameter of 20 mm in a longitudinal direction and wound to a diameter of 15 mm in a lateral direction, none of cracking and breakage was observed in the laminate.

Further, this laminate is provided with a vinyl acetate resin adhesive applied to on its back and then was used in profile wrapping fabrication of a plywood having a size of 23 mm height, 110 mm width and 1,800 mm length. The laminate was strongly bonded to the plywood on the each surface and at each corner of the plywood, thereby obtaining a good product.

Example 4

A melt blend of 95% by weight of nylon-6/66/12 (component ratio=40:20:40) having a melting point of 120° C. and an MFR at 190° C. of 60 g/10 min and 5% by weight of hydrogenated rosin ester, which was obtained by extruding them through a single screw extruder, was selected as the heat bonding resin (a), and a biaxially oriented nylon-6 film with a thickness of 15 μm prepared by biaxially orienting nylon-6 resin having a melting point of 215° C. and a Rockwell R hardness of 119 was selected as the mar-proof surface layer (B) forming resin. The above heat bonding resin (a) was extrusion laminated onto the surface of the mar-proof surface layer film B by means of an extrusion laminator equipped with extruder (screw L/D: 32, diameter: 65 mm) under such conditions that the resin temperature, coating thickness and processing speed were 190° C., 20 μm and 20 m/min, respectively, to thereby form the heat bonding layer (A) on the mar-proof surface layer film B. Thus, a resin composite film consisting of 15 μm of mar-proof surface layer (B)/20 μm of heat bonding layer (A) was obtained.

This composite film was thermocompression bonded to a 0.3 mm thick decorative sliced veneer in the same manner as in Example 1, thereby obtaining a laminate having the biaxially oriented nylon-6 film as the surface protective layer according to the present invention.

This laminate had a large bonding strength, and a peeling test resulted in a cohesive failure of the sliced veneer. This laminate possessed the texture of natural wood and exhibited beautiful gloss. Further, the laminate was excellent in mechanical strength properties such as bending strength.

Although the resultant laminate was wound to a diameter of 20 mm in a longitudinal direction and wound to a diameter of 15 mm in a lateral direction, none of cracking and breakage was observed in the laminate.

Example 5

25% by weight of ethylene/methacrylic acid copolymer (methacrylic acid content: 15% by weight, MFR at 190° C.: 60 g/10 min), 54.8% by weight of ethylene/ethyl acrylate copolymer (ethyl acrylate content: 19% by weight, MFR at 190° C.: 5 g/10 min), 20% by weight of hydrogenated rosin ester and 0.2% by weight of erucamide were dry blended and pelletized by a single-screw extruder (screw L/D: 28, diameter: 40 mm) at a resin temperature of 180° C. Thus, a heat bonding resin composition (a) was obtained.

The MFR at 190° C. and Vicat softening point of this heat bonding resin composition (a) were 35 g/10 min and 46° C., respectively.

This heat bonding resin composition (a) was introduced in a cast film forming machine comprising a single-screw extruder (screw L/D: 28, diameter: 50 mm) equipped with a 400 mm wide T die and extruded at a resin temperature of 200° C. and at an extrusion speed of 20 m/min. Thus, a heat bonding film (A) having a thickness of 30 μm was obtained.

Separately, a biaxially oriented polyester film (thickness: 19 μm) having a matt coating on its one side was provided as the mar-proof surface layer film B. The side not having the matt coating was subjected to corona treatment.

The thus obtained mar-proof surface layer film B and heat bonding film A were sandwich laminated with the use of molten polyethylene film in the same manner as in Example 2. As a result, a composite film having a layer structure consisting of 19 μm thick mar-proof surface layer film B/20 μm thick polyethylene film/30 μm thick heat bonding film A was prepared. In this composite film, the individual layers strongly bonded to each other.

The melting point and Rockwell R hardness of the polyester as a raw material of the mar-proof surface layer film B were 256° C. and 111, respectively.

This composite film was heated and bonded to a decorative sliced veneer in the same manner as in Example 3, thereby obtaining a laminate having a layer structure consisting of mar-proof surface layer (matt coated biaxially oriented polyester film)/intermediate layer (polyethylene)/ heat bonding layer (tackifier loaded ethylene/ethyl acrylate copolymer composition)/decorative sliced veneer.

This laminate had a large bonding strength, and a peeling test resulted in a cohesive failure of the sliced veneer.

Further, this laminate possessed the texture of natural wood and had improved surface strength. Although the thus obtained laminate was wound to a diameter of 20 mm in a longitudinal direction and wound to a diameter of 15 mm in a lateral direction, none of cracking and breakage was observed in the laminate.

Example 6

A composite film having a layer structure consisting of 25 $\mu$m thick mar-proof surface layer film B/20 $\mu$m thick polyethylene film/30 $\mu$m adhesive film A was produced in the same manner as in Example 5, except that, in place of the one-side matt coated biaxially oriented polyester film (thickness: 19 $\mu$m), a one-side matt coated biaxially oriented polyethylene naphthalate film (thickness. 25 $\mu$m) was used as the mar-proof surface layer film B.

The melting point and Rockwell R hardness of the polyethylene naphthalate as a raw material of the mar proof surface layer film B were 270° C. and 114, respectively.

This composite film was heated and bonded to a decorative sliced veneer in the same manner as in Example 3, thereby obtaining a laminate having a layer structure consisting of mar-proof surface layer (matt coated biaxially oriented polyethylene naphthalate film)/intermediate layer (polyethylene)/heat bonding layer (tackifier loaded ethylene/methacrylic acid copolymer and ethylene/ethyl acrylate copolymer composition)/decorative sliced veneer.

This laminate had a large bonding strength, and a peeling test resulted in a cohesive failure of the sliced veneer.

Further, this laminate possessed the texture of natural wood and had improved surface strength. Although the thus obtained laminate was wound to a diameter of 20 mm in a longitudinal direction and wound to a diameter of 15 mm in a lateral direction, none of cracking and breakage was observed in the laminate.

Comparative Example 1

Test was conducted in the same manner as in Example 2, except that ethylene/vinyl acetate copolymer having a vinyl acetate content of 6% by weight and exhibiting an MFR at 190° C. of 8 g/10 min was used as the heat bonding resin (a).

The thus obtained laminate having a layer structure consisting of mar-proof surface layer (matted biaxially oriented polypropylene film)/intermediate layer (polyethylene)/heat bonding layer (ethylene/vinyl acetate copolymer)/decorative sliced veneer had a poor bonding strength between the composite film and the sliced veneer and peeling was easily conducted by hands.

Comparative Example 2

Commercially available polymethyl methacrylate resin film (trade name: Acryprene HBS matt type, thickness: 35 $\mu$m, produced by Mitsubishi Rayon Co., Ltd.) was disposed on the top surface of a 0.3 mm thick decorative sliced veneer backed with nonwoven fabric and introduced between metal roll for compression bonding heated at 150° C. and rubber roll to thereby effect a thermocompression bonding of the polymethyl methacrylate resin film to the sliced veneer.

After cooling, the bonding strength between the film and the sliced veneer was inspected. Both were easily peeled from each other with hands. Although wood grain of the sliced veneer was transcribed on the peeled film and there were remains of softening of film by heating and intrusion thereof into wood irregularities, these did not lead to attainment of satisfactory bonding strength.

Comparative Example 3

The profile wrapping characteristics of the same 0.3 mm thick decorative sliced veneer backed with nonwoven fabric as used in Example 1 were inspected by winding it as it was in a longitudinal direction and a lateral direction.

When the sliced veneer was wound to a diameter of 50 mm in a longitudinal direction, partial cracking was observed. Further, when the sliced veneer was wound to a diameter of 40 mm in a longitudinal direction, cracking was observed.

What is claimed is:

1. A wood decorative material coated with resin composite film, comprising:

(i) a wood substrate, (ii) a heat bonding layer (A) disposed on a surface of the wood substrate, said heat bonding layer (A) formed from a heat bonding resin composition (a) comprising 100 parts by weight of a thermoplastic resin (a-1) composed of at least one member selected from the group consisting of polyolefins, polyolefin copolymers, polyesters, and polyamides, and 0.001 to 80 parts by weight of a tackifier resin (a-2), said heat bonding resin composition (a) having a melting point or softening temperature of 170° C. or below and exhibiting a melt flow rate (MFR) at 190° C. of 1 to 500 g/10 min, (iii) an adhesive layer (C) contacting the heat bonding layer (A) and comprising at least one adhesive component selected from the group consisting of an epoxy reactive adhesive, an isocyanate reactive adhesive, a polyester reactive adhesive, a polyethylene, and a resin prepared by a graft polymerization of a polyolefin or olefinic copolymer in the presence of maleic anhydride, acrylic acid or methacrylic acid, and (iv) a mar-proof surface layer (B) bonded to the wood substrate surface by means of the heat bonding layer (A) and adhesive layer (C), wherein (B) is formed from a biaxially oriented resin film, the resin having a melting point or softening temperature at least 20° C. higher than resin (a-1).

2. The wood decorative material coated with resin composite film as claimed in claim 1, where in the thermoplastic resin (a-1) as a component of the heat bonding resin composition is composed of at least one resin selected from the group consisting of ethylene/fatty acid vinyl ester copolymers, ethylene/$\alpha,\mu$-unsaturated carboxylic acid alkyl ester copolymers, ethylene/$\alpha,\mu$-unsaturated carboxylic acid copolymers and products of partial metal neutralization of ethylene/$\alpha,\beta$-unsaturated carboxylic acid copolymers.

3. The wood decorative material coated with resin composite film as claimed in claim 1, wherein the thermoplastic resin (a-1) as a component of the heat bonding resin composition comprises a crystalline or amorphous copolyester and/or copolyamide.

4. The wood decorative material coated with resin composite film as claimed in claim 1, wherein the biaxially oriented resin film B is composed of a film (b) comprising a polyolefin or a polyolefin copolymer.

5. The wood decorative material coated with resin composite film as claimed in claim 1, wherein the mar-proof surface layer (B) is formed from a film (b) composed of a resin having a Shore D hardness of at least 55 and a Rockwell hardness of 125 or below.

6. A process for producing a wood decorative material coated with resin composite film according to claim 1, comprising (i) disposing on a surface of a wood substrate a heat bonding layer (A) composed of a heat bonding resin composition (a) comprising 100 parts by weight of a thermoplastic resin (a-1) and 0.001 to 80 parts by weight of a tackifier resin (a-2), said heat bonding resin composition having a melting point or softening temperature of 170° C. or below and exhibiting a melt flow rate (MFR) at 190° C. of 1 to 500 g/10 min, and (ii) bonding a mar-proof surface layer (B) to the wood substrate by means of the heat bonding layer (A), and an adhesive layer (C) as defined in claim 1, wherein a film B for forming the mar-proof surface layer (B) is extrusion coated with the heat bonding resin composition (a) to thereby form a composite film having a layer construction of the heat bonding layer (A)/ layer of other adhesive component (C) mar-proof surface layer (B), and the composite film is heat bonded to the wood substrate surface.

7. A process for producing a wood decorative material coated with resin composite film according to claim 1, comprising (i) disposing on a surface of a wood substrate a heat bonding layer (A) composed of a heat bonding resin composition (a) comprising 100 parts by weight of a thermoplastic resin (a-1) and 0.001 to 80 parts by weight of a tackifier resin (a-2), said heat bonding resin composition having a melting point or softening temperature of 170° C. or below and exhibiting a melt flow rate (MFR) at 190° C. of 1 to 500 g/10 min, and (ii) bonding a mar-proof surface layer (B) to the wood substrate by means of the heat bonding layer (A), and an adhesive layer (C), as defined in claim 1, wherein the heat bonding resin composition (a) is molded into a film to thereby obtain a heat bonding film A, (iii) subsequently the heat bonding film A is bonded to a resin film B for forming the mar-proof surface layer (B) with another adhesive component (c) to thereby form a composite film having a layer construction of the heat bonding layer (A)/layer of other adhesive component (C)/mar-proof surface layer (B), and the composite film is heat bonded to the wood substrate surface.

8. A process for producing a wood decorative material coated with resin composite film according to claim 1, comprising (i) disposing on a surface of a wood substrate a heat bonding layer (A) composed of a heat bonding resin composition (a) comprising 100 parts by weight of a thermoplastic resin (a-1) and 0.001 to 80 parts by weight of a tackifier resin (a-2), said heat bonding resin composition having a melting point or softening temperature of 170° C. or below and exhibiting a melt flow rate (MFR) at 190° C. of 1 to 500 g/10 min, and (ii) bonding a mar-proof surface layer (B) to the wood substrate by means of the heat bonding layer (A), and an adhesive layer (C) as defined in claim 1, wherein a resin (b) for forming the mar-proof surface layer (B) and the heat bonding resin composition (a) are co-extruded, or a resin (b) for forming the mar-proof surface layer (B) and the heat bonding resin composition (a) are co-extruded with another adhesive resin (c') interposed therebetween, thereby forming a composite film having a layer construction of the mar-proof surface layer (B)/heat bonding layer (A)/layer of adhesive resin (c) or a layer construction of the mar-proof surface layer (B)/layer of other adhesive resin (C')/heat bonding layer (A), and the composite film is heat bonded to the wood substrate surface.

9. The wood decorative material according to claim 1, wherein said material is produced by a process comprising (i) disposing on a surface of the wood substrate a heat bonding layer (A) composed of a heat bonding resin composition (a) comprising 100 parts by weight of a thermoplastic resin (a-1) composed of a polyolefin or a ployolefin copolymer and 0.001 to 80 parts by weight of a tackifier resin (a-2) composed of an alicyclic hydrocarbon or a hydrogenated resin ester, said heat bonding resin composition (a) having a melting point or softening temperature of 170° C. or below and exhibiting a melt flow rate (MFR) at 190° C. of 1 to 500 g/10 min, and (ii) bonding a mar-proof surface layer (A), and the adhesive layer (C), wherein a film B for forming the mar-proof surface layer (B) is extrusion coated with the heat bonding resin composition (a) to thereby form a composite film having a layer construction of the heat bond layer (A)/adhesive layer (C)/mar-proof surface layer (B), and the composite film is heat bonded to the wood substrate surface.

10. The wood decorative material according to claim 1, wherein said material is produced by a process comprising (i) disposing on a surface of the wood substrate a heat bonding layer (A) composed of a heat bonding resin composition (a) comprising 100 parts by weight of a thermoplastic resin (a-1) composed of a polyolefin or a polyolefin copolymer, and 0.001 to 80 parts by weight of a tackifier resin (a-2) composed of an alicyclic hydrocarbon or a hydrogenated resin ester, said heat bonding resin composition (a) having a melting point or softening temperature of 170° C. or below and exhibiting a melt flow rate (MFR) at 190° C. of 1 to 500 g/10 min, and bonding a mar-proof surface layer (B) to the wood substrate by means of the heat bonding layer (A); and (ii) molding the heat bonding resin composition (a) into a film to thereby obtain a heat bonding film A, and subsequently the heat bonding film A is bonded to a resin film B which has been corona treated for forming the mar-proof surface layer (B) with another adhesive component (c) to thereby form:

(iii) a composite film having a layer construction of the heat bonding layer (A)/layer of other adhesive component (C)/mar-proof surface layer (B), and the composite film is heat bonded to the wood substrate surface.

11. The wood decorative material produced by the process of claim 10, wherein the adhesive component (c) is composed of a polyolefin or a polyolefin copolymer.

12. The wood decorative material according to claim 1, wherein said material is produced by a process comprising (i) disposing on a surface of the wood substrate a heat bonding layer (A) composed of a heat bonding resin composition (a) comprising 100 parts by weight of a thermoplastic resin (a-1) composed of a polyolefin or a polyolefin copolymer, and 0.001 to 80 parts by weight of a tackifier resin (a-2), composed of an alicyclic hydrocarbon, or a hydrogenated resin ester, said heat bonding resin composition (a) having a melting point or softening temperature of 170° C. or below and exhibiting a melt flow rate (MFR) at 190° C. of 1 to 500 g/10 min, and bonding a mar-proof surface layer (B) to the wood substrate by means of the heat bonding layer (A); and (ii) co-extruding the resin (b) for forming the mar-proof surface layer (B) and the heat bonding resin composition (a) or corona treating the resin (b), and subsequently co-extruding the treated resin (b) for forming the mar-proof surface layer (B) and the heat bonding resin composition (a), and (iii) interposing resin (c') therebetween, thereby forming a composite film having a layer construction of the mar-proof surface layer (B)/heat bonding layer (A) or a layer construction of the mar-proof surface layer (B)/layer of other adhesive resin (C')/heat bonding layer (A), and (iv) the composite film is heat bonded to the wood substrate surface.

13. The wood decorative material produced by the process of claim 12, wherein the adhesive component (c') is composed of polyolefin or a polyolefin copolymer.

14. The wood decorative material according the claim 1, wherein the resin (a-1) comprises a polypropylene/ethylene random copolymer, and resin (a-2) comprises an alicyclic hydrocarbon, and the mar-proof layer B is composed of a biaxially oriented polypropylene film.

15. The wood decorative material according to claim 1, wherein the resin (a-1) comprises ethylene/vinyl acetate copolymer, resin (a-2) comprises a hydrogenated resin ester, and surface layer film B comprises a corona treated polypropylene film.

16. The wood decorative material according to claim 1, wherein the resin (a-1) comprises nylon 6/66/12 and resin (a-2) comprises an alicyclic hydrocarbon or a hydrogenated resin ester, and surface film B comprises biaxially oriented nylon-6.

17. The wood decorative material according to claim 1, where the resin (a-1) comprises an ethylene/methacrylic acid copolymer, the resin (a-2) comprises an alicyclic hydrocarbon or a hydrogenated resin ester, and surface film B comprises polyethylene.

18. The wood decorative material according to claim 1, wherein the resin (a-1) comprises ethylene/ethylacrylate copolymer; resin (a-2) comprises hydrogenated resin ester; and surface film B comprises either biaxially oriented polyester or polyethylene naphthalate.

* * * * *